US008782772B2

(12) United States Patent
Vanniarajan

(10) Patent No.: US 8,782,772 B2
(45) Date of Patent: Jul. 15, 2014

(54) MULTI-SESSION SECURE TUNNEL

(75) Inventor: Kadirvel C. Vanniarajan, Hyderabad (IN)

(73) Assignee: Microsoft Corporation, Redmond, WA (US)

(*) Notice: Subject to any disclaimer, the term of this patent is extended or adjusted under 35 U.S.C. 154(b) by 1241 days.

(21) Appl. No.: 11/904,751

(22) Filed: Sep. 28, 2007

(65) Prior Publication Data

US 2009/0089863 A1    Apr. 2, 2009

(51) Int. Cl.
*H04L 29/06*    (2006.01)
(52) U.S. Cl.
USPC ................................................. 726/15; 726/5
(58) Field of Classification Search
CPC .. H04L 63/0478; H04L 43/0876; H04L 43/16
USPC ......................................................... 726/5, 15
See application file for complete search history.

(56) References Cited

U.S. PATENT DOCUMENTS

| 6,463,475 | B1 * | 10/2002 | Calhoun ........................ 709/227 |
| 6,519,254 | B1   | 2/2003  | Chuah et al. |
| 6,584,567 | B1   | 6/2003  | Bellwood et al. |
| 6,651,105 | B1   | 11/2003 | Bhagwat et al. |
| 6,701,439 | B1   | 3/2004  | Dunn |
| 6,711,137 | B1 * | 3/2004  | Klassen et al. ................. 370/252 |
| 6,839,815 | B2   | 1/2005  | Kagami et al. |
| 6,842,463 | B1 * | 1/2005  | Drwiega et al. ............... 370/468 |
| 6,851,030 | B2   | 2/2005  | Tremaine |
| 6,915,436 | B1 * | 7/2005  | Booth et al. ...................... 726/3 |
| 7,020,084 | B1 * | 3/2006  | Tanaka et al. .................. 370/235 |
| 7,117,526 | B1 * | 10/2006 | Short .................................. 726/5 |
| 7,149,892 | B2   | 12/2006 | Freed et al. |
| 7,225,259 | B2   | 5/2007  | Ho et al. |
| 7,493,383 | B1 * | 2/2009  | Mukerji ........................ 709/223 |
| 7,512,061 | B2 * | 3/2009  | Karlsson ....................... 370/216 |
| 7,609,699 | B2 * | 10/2009 | Allen et al. ................. 370/395.2 |
| 7,646,710 | B2 * | 1/2010  | Christie, IV .................. 370/230 |
| 7,649,890 | B2 * | 1/2010  | Mizutani et al. ......... 370/395.21 |
| 8,086,845 | B2   | 12/2011 | Jain et al. |
| 8,238,343 | B2 * | 8/2012  | Lee et al. .................... 370/395.2 |
| 8,412,831 | B2 * | 4/2013  | Detrick et al. ................ 709/227 |
| 2001/0033557 | A1 | 10/2001 | Amalfitano |
| 2002/0010866 | A1 | 1/2002  | McCullough et al. |
| 2003/0012143 | A1 | 1/2003  | Chen |
| 2004/0044789 | A1 * | 3/2004 | Angel et al. .................. 709/238 |
| 2004/0117428 | A1 | 6/2004  | Surma et al. |
| 2004/0255049 | A1 * | 12/2004 | Italiano et al. ............... 709/250 |
| 2005/0234926 | A1 | 10/2005 | Warner |
| 2005/0262228 | A1 | 11/2005 | Trappeniers et al. |
| 2006/0085420 | A1 | 4/2006  | Hwang |
| 2006/0168260 | A1 | 7/2006  | Hinde et al. |

(Continued)

OTHER PUBLICATIONS

RFC 1990; The PPP Multilink Protocol (MP); K. Sklower, B. Lloyd, G. McGregor, D. Carr, T. Caradetti; Aug. 1996.*

(Continued)

*Primary Examiner* — Luu Pham
*Assistant Examiner* — James Turchen
(74) *Attorney, Agent, or Firm* — John Jardine; Andrew Sanders; Micky Minhas

(57) ABSTRACT

A method of communicating data over a network is provided. A secure tunnel may be implemented through the network between two computers. Performance limitations of the secure tunnel with a single session can be alleviated by establishing multiple sessions for the tunnel.

20 Claims, 7 Drawing Sheets

(56) References Cited

U.S. PATENT DOCUMENTS

2007/0027983 A1 2/2007 Bowra et al.
2007/0081554 A1 4/2007 Saffre
2007/0250642 A1* 10/2007 Thubert et al. ............... 709/245
2009/0037976 A1* 2/2009 Teo et al. .......................... 726/1

OTHER PUBLICATIONS

WindowSecurity; Secure Socket Tunneling Protocol; Ricky M. Magalhaes; Apr. 27, 2007.*
Low-latency Secure Mobile Communications; Vinod Kumar Choyi and Michel Barbeau; 0-7803-9182-9/05 © 2005 IEEE.*
Layer Two Tunneling Protocol—Version 3 (L2TPv3); RFC 3931, Mar. 2005; J. Lau, M. Townsley, I. Goyret.*
"HTTPS Tunnel Client;" Oct. 2006; 3 pages.
"IxAccess;" 2006; Ixia Corporation; Calabasas, CA; 4 pages.
Kasera, Sneha, et al.; On Securely Enabling Intermediary-Based Services and Performance Enhancements for Wireless Mobile Users; Association for Computing Machinery; WiSE'03; Sep. 19, 2003; San Diego, CA; pp. 61-68.
Yong, Y. et al., "Preliminary Experience of ARMS: A Web Service Based Automatic Resource Management System," http://www.hpl.hp.com/techreports/2002/HPL-2002-295.ps, 2002.
Cockcroft, A., Service Level Definitions and Interactions, Sun Microsystems, Inc., http://www.sun.com/blueprints/0499/method1.pdf, 1999.
Schlegel, K, et al., "User Experience and the Bottom Line," MetaGroup, http://www.keynote.com/docs/datasheets/UserExpandtheBottomLine.pdf, 2003.

* cited by examiner

MULTI-SESSION SECURE TUNNEL

BACKGROUND OF THE INVENTION

In recent years, both the mobility of users of computing devices and the number of locations where users can receive network access have increased significantly. Reliable and secure networks are desirable for many enterprises (e.g., business, government, agencies, etc.).

Thus, it is desirable to enable a remote user working outside an enterprise network to connect to the network in a secure fashion, often via a public network (e.g., the Internet).

Among many techniques developed to transmit traffic over a public network, virtual private network (VPN) technology is widely used to provide a secure tunnel between remote users and an enterprise network by enabling exchange of encrypted data over any public network, such as, for example, the Internet or other wide area networks. VPN technology typically encompasses protocols such as, for example, Point-to-Point Tunneling Protocol (PPTP) and Layer Two Tunneling Protocol with Internet Protocol security (L2TP/IPSec).

SUMMARY OF THE INVENTION

Applicants have appreciated that performance of a secure tunnel may be limited by performance of the underlying connection (e.g., a TCP connection for SSTP). For example, the bandwidth that the TCP connection can utilize may be less than an available bandwidth, which may impact performance of the secure tunnel. To improve network utilization in one embodiment, multiple secure sessions for a single secure tunnel between end points (e.g., a client and a server) may be established. This alleviates the problem associated with underutilizing capabilities of the connection. The overall throughput achieved by a secure tunnel over a connection (e.g., TCP connection) may be increased by establishing multiple sessions over the tunnel. After establishing a secure tunnel with a first session, a technique may be used to securely associate additional sessions established for the same secure tunnel. The multiple sessions over the SSTP tunnel may be transparent to applications and protocols transmitting data over the tunnel.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
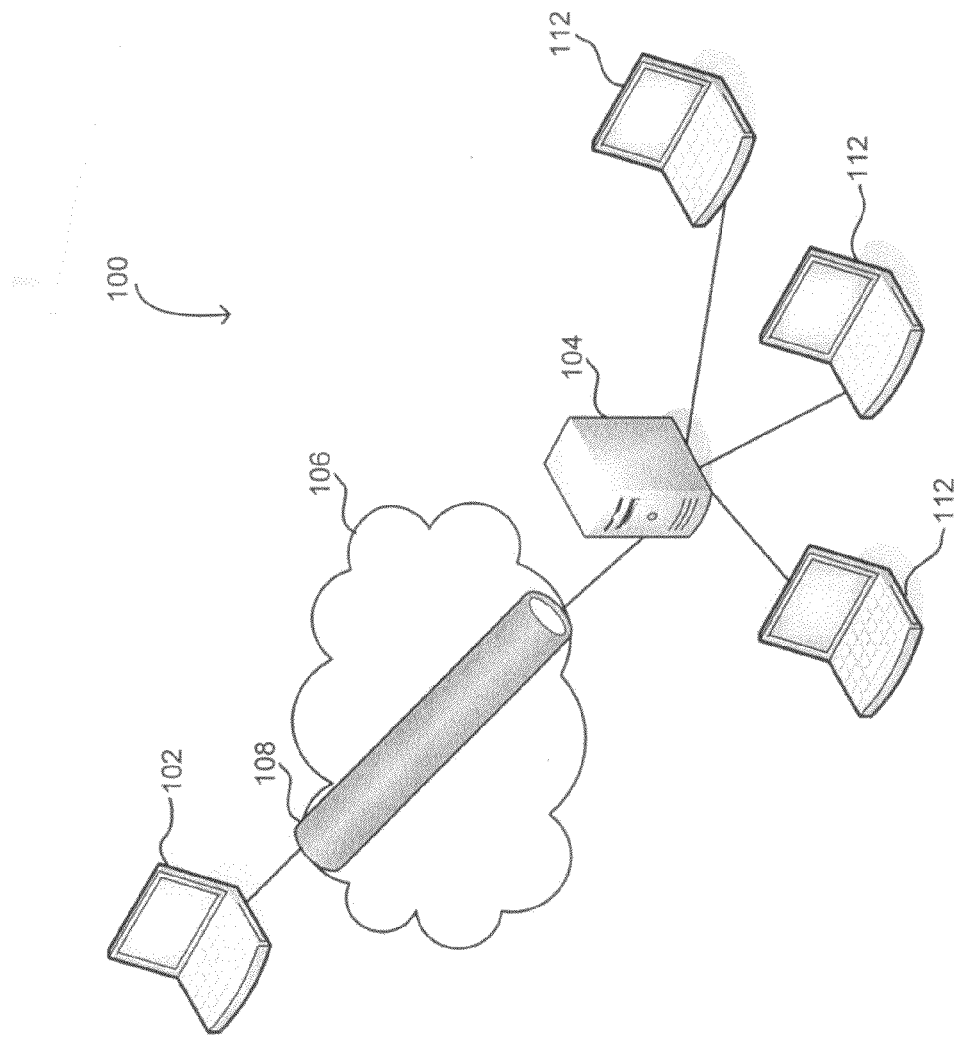
FIG. 1 is a is a conceptual illustration of an environment in which data may be sent over a VPN connection.

Data sent between computers in an encrypted form over a network using existing VPN protocols may encounter difficulties in, for example, traversing network address translation (NAT) routers, proxy server and firewalls located between the computers. VPN protocols often require special set up in these routers, proxies and firewalls.

Recently developed Secure Socket Tunneling Protocol (SSTP) is a secure tunneling protocol over hypertext transport protocol secure (HTTPS) connection that may support tunneling for any application or protocol. SSTP may allow any network traffic on top of it to be NAT and firewall friendly since HTTPS can traverse virtually all firewalls, proxies (e.g., an internet server provider (ISP) proxy) and is NAT friendly. An example of a network traffic that can be carried over SSTP is a point-to-point protocol (PPP) traffic. Using PPP, which may provide client authentication, provides a mechanism to use SSTP as a SSTP tunnel.

A SSTP tunnel may be established over a secure channel (e.g., HTTPS channel) on top of a network connection such as a TCP connection.

Embodiments of the present invention are directed to establishing multiple sessions for a secure tunnel through a network between two computers. In some embodiments of the invention, the secure tunnel is based on the recently developed SSTP and is a SSTP tunnel. However, the invention is not limited in this respect, as multiple sessions may be used to improve performance of other types of tunnels.

As mentioned above, the inventors have appreciated that performance limitations of a network connection over which a secure tunnel is established may affect performance of the secure tunnel. Examples of network performance characteristics associated with a TCP connection may be bandwidth utilization, packet loss and latency.

The inventors have further appreciated that drawbacks associated with network performance limitations of a secure tunnel (e.g., a SSTP tunnel) with a single session can be alleviated by establishing multiple sessions in parallel for the tunnel. Multiple sessions enable improved performance for the connection, as information may travel over the multiple sessions simultaneously as a connection may be provided with multiple sessions in a manner that is transparent to any applications utilizing the connection. When network characteristics indicate that a secure tunnel with a single session underutilizes network capabilities, one or more additional sessions may be established.

In one embodiment described in detail below, the tunnel provided with multiple sessions is a SSTP tunnel. However, it should be appreciated that the invention is not limited in this respect and that multiple sessions can also be provided for other types of tunnels.

In one embodiment of the invention, a SSTP tunnel with a single SSTP session may be established between computers, for example, a client and a server. To establish the tunnel, a client may connect to a server (e.g., using HTTPS). The server may be a VPN server or other server that serves as a gateway to an enterprise network. After the client connects to the server using HTTPS or other protocol, a higher-level protocol (e.g., PPP) may then negotiate and initiate as described in more detail below.

FIG. 1 illustrates an example of a computer system 100 on which aspects of the invention may be implemented. Computer system 100 comprises a client 102 and a server 104 communicating over a network 106. Network 106 may be a public network such as the Internet, but the invention is not limited in this respect, as network 106 may be any suitable network.

In one embodiment of the invention, server 104 is a SSTP server and client 102 is a SSTP client, meaning that each is capable of forming a connection using SSTP. Client 102 and server 104 may comprise one or more computing devices that include software or components allowing creating a SSTP channel between client 102 and server 104. Therefore, both client 102 and server 104 may include components implemented in software, hardware or combination thereof that provide functionality enabling establishing a secure tunnel between the client and the server.

Server 104 may act as a gateway for a single computing device or multiple computing devices. In the example illustrated, computers 112 that operate behind server 104 may belong, for example, to an enterprise network. Client 102, when located outside the enterprise network, may access applications on computers 112 via server 104.

It should be appreciated that any of the computers described above and any of their components can be implemented in any of numerous ways. For example, the functional components or operations described herein may be implemented using software, hardware or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

As shown in FIG. 1, SSTP tunnel 108 may be created through network 106. SSTP tunnel 106 is a secure communication channel over which data may be securely (e.g., via encryption) transmitted over network 106. In some embodiments of the invention, SSTP tunnel 106 is a VPN tunnel that utilizes the SSTP protocol. However, it should be appreciated that the invention is not limited in this respect and that other protocols may be used to create a tunnel. Furthermore, the SSTP protocol may serve as a firewall traversal mechanism for any suitable network connection.

A connection utilizing the SSTP protocol is referred to herein as a SSTP connection. An SSTP connection can be implemented, for example, as shown in the examples which follow, and as described in U.S. patent application Ser. No. 11/561,947, entitled "SECURE TUNNEL OVER HTTPS CONNECTION," filed on Nov. 21, 2006, which is incorporated herein by reference. Some changes have been made to reflect updates to the SSTP protocol.

Figure 2:
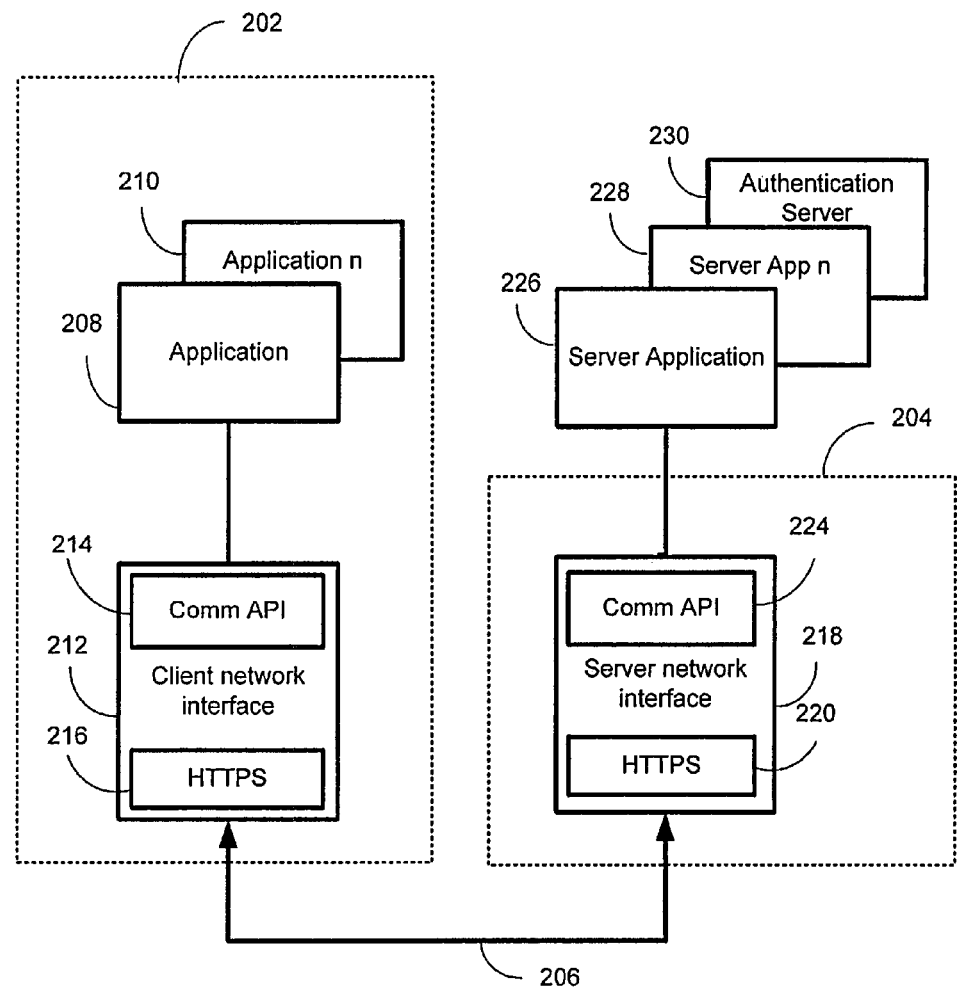
FIG. 2 is a schematic block diagram of two computers connected via a SSTP connection in accordance with one embodiment of the present invention.

FIG. 2 is a schematic block diagram of two computers (e.g., a client and a server) connected via a SSTP connection according to one embodiment of the invention. A first computer 202 (e.g., client 102 from FIG. 1 supporting user applications such as email, web browsing, database access, etc.) may be coupled to a second computer 204 (e.g., server 104 from FIG. 1). In the exemplary embodiment, the first computer 202 is outside an enterprise network protected, for example, by a firewall. The second computer 204 may be a server supporting client-server communications for the applications on the first computer 202. However, the invention is not limited in this respect, and the second computer 204 may be a remote access server dedicated to serving as gateway supporting communications with computers outside the enterprise network. The computers 202 and 204 may be connected via network 206, which may be a public network such as the Internet. Application 208 and other applications represented by "Application n" 210 may send and receive data using client network interface 212. The client network interface 212 may present a communication application programming interface (API) 214 to the applications 208 and 210. One example of the communication API is an API to implement the PPP. It should be appreciated that the invention is not limited in this respect, as any protocol can be supported as long as both computers 202 and 204 agree to it. The client network interface 212 may include an HTTPS module 216 for coupling to the network 206.

At the server side, a server network interface 218 may include an HTTPS module 220 coupled to the network 206 and may also include a communication API 224. Communication API 224 may attach to one or more server hosting applications (e.g., 226-230). In one embodiment, one of the server applications may include an authentication server 230. The authentication server 230 may be used to authenticate client credentials during session startup, and may also include support for secure socket layer (SSL) key exchange as part of establishing the HTTPS session. Traffic between the second computer 204 and various application servers (e.g., 226, 228 and 230) may be routed using IP/IPv6 routing protocols or other routing protocols.

In one embodiment, an application on the client, such as, for example, a web browser application, may start up and connect with the network 206 via, for example, an Internet Service Provider (ISP). A connection may be established to the server network interface 218 from the client network interface 212 to establish a SSTP tunnel, which is discussed in more detail below. After establishing the SSTP tunnel, the server network interface 218 may forward data traffic to one or more of the server applications 226, 228 and 230 using an agreed to protocol, for example, PPP. In one exemplary embodiment, for example, in a corporate environment, the authentication server 230 may be used to establish the identity of a user at the first computer 202. Once the user has been authenticated, the user may be granted access to one or more corporate applications, such as e-mail, database access, corporate bulletin boards, etc.

Figure 3:
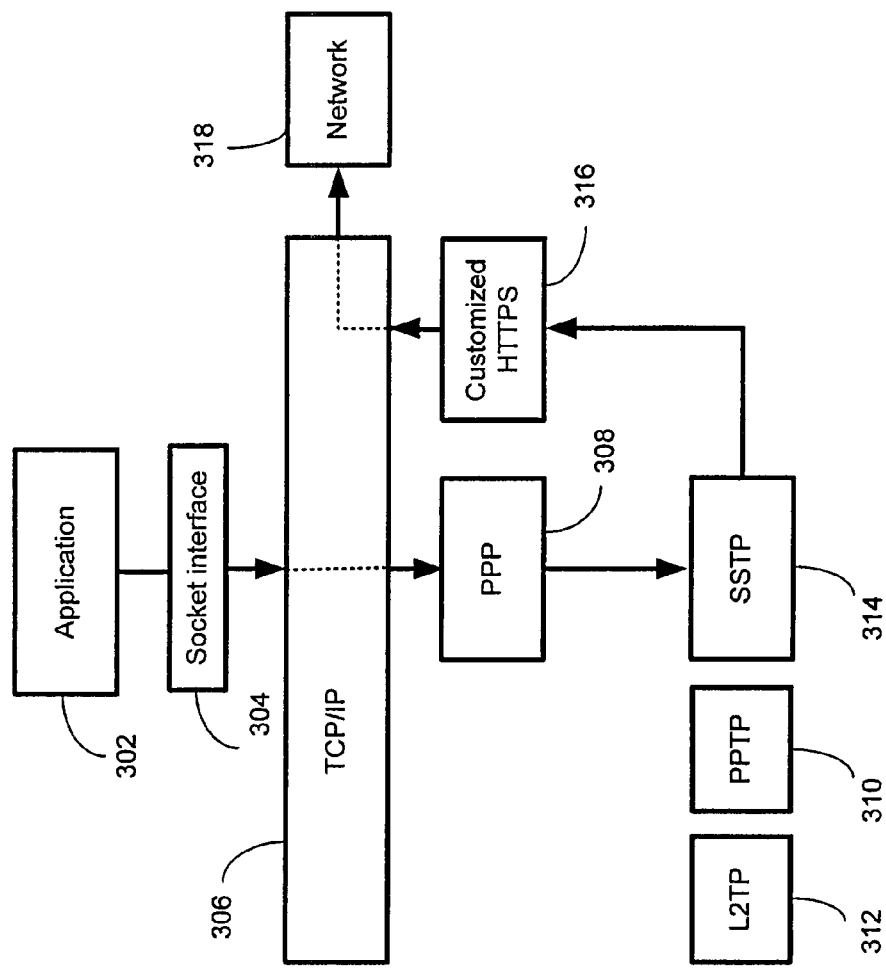
FIG. 3 is a schematic block diagram of functional blocks supporting a SSTP connection in accordance with one embodiment of the present invention.

FIG. 3 is an exemplary block diagram of functional components or modules supporting a SSTP connection according to one embodiment of the invention. The SSTP connection may be used to transmit outbound traffic from a computer such as, for example, the first computer 202 or the second computer 204 illustrated in FIG. 2. Data transmission using the SSTP protocol may follow a three stage process: (1) secure session establishment, (2) SSTP control traffic, and (3) SSTP data traffic.

Secure session establishment involves establishing a TCP connection between the client and server followed by a standard SSL handshake, including Diffie-Hellman key exchange. These establish a HTTPS session.

Once the HTTPS session is established, a SSTP driver (SSTPDRV) may activate a state machine that manages the SSTP protocol. A PPP session negotiation may then be made over the SSTP connection and the PPP session is in place, the channel is ready for tunneling application traffic through the network via the PPP protocol.

After the initial session setup and security negotiation are complete, an application 302 may send data to a socket interface 304, such as, for example, a Winsock interface. The socket interface 304 may pass the data down the protocol stack to a TCP/IP interface 306. The TCP/IP interface 306 may then determine that the packet is destined for the SSTP tunnel and route the data to the appropriate protocol layer, which, in one embodiment, is a PPP module 308. The SSTP protocol may exist at the same level as other secure protocols, such as, for example, PPTP 310 or L2TP 312. The PPP module 308 performs PPP framing and encapsulation and passes the data to a dedicated SSTP module 314. The SSTP module 314 may handle interactions between the kernel and user modes, perform specialized buffering, support SSTP command set and perform other suitable functions. The processed data may then be sent to the HTTPS module 316 for encryption using SSL and sent back to the TCP/IP interface 306. The TCP/IP interface 306 may recognize this traffic as standard HTTPS traffic and may route it to the network 318. HTTPS traffic is widely used for such applications as, for example, Internet commerce, and is usually not blocked by ISPs or firewalls. When used with a web proxy, the HTTPS traffic is forwarded to an appropriate port, such as, for example, a standard HTTPS port 443.

Data over the secure tunnel using the SSTP protocol may include control traffic and data traffic. An exemplary command set for control and data traffic and their corresponding packet format follows.

The SSTP protocol consists of two types of packets:

Control Packet (SCP—SSTP Control Packet);

Data Packet (SDP—SSTP Data Packet).

As the names imply, the control packet may be some channel specific control message and the data packet carries the data from the higher layer.

The SSTP protocol has a primary header which will be common across both the control and the data message.

```
typedef BYTE SSTP_PACKET_TYPE, *PSSTP_PACKET_TYPE;
#define SSTP_PACKET_TYPE_CONTROL    ((BYTE)0)
#define SSTP_PACKET_TYPE_DATA       ((BYTE)1)
#define SSTP_VERSION_1              ((BYTE)0x00010000)
typedef struct _SSTP_LENGTH
{
    USHORT   Reserved : 4;
    USHORT   Length : 12;
} SSTP_LENGTH, *PSSTP_LENGTH;
typedef struct _SSTP_HEADER
{
    BYTE           Version;
    BYTE           Reserved:7;
    BYTE           ControlMessage:1;
    SSTP_LENGTH    Length;
    union
    {
        SSTP_CONTROL_MESSAGE    ControlMessage;
        BYTE                    Payload[0]
    };
} SSTP_HEADER, *PSSTP_HEADER;
```

Version—1 Byte

Control/Data—1 byte with just the least significant bit being used. The rest are reserved bits Length—2 Bytes—Restricted to 12 bits

```
0        8      16   20     24      32
+--------+-----+---+-+-----+-+-----+-----+-----+--
|Version | Reserved|C|X|X|X|X|Length           |...
+--------+-----+---+-+-----+-+-----+-----+-----+--
```

The Length field is the length of the SSTP packet excluding the SSTP_HEADER. It cannot exceed 4095 bytes. The SSTP protocol should not accept transmission requests (from higher layers—in our case PPP) exceeding this limit, as otherwise SSTP protocol will have to handle fragmentation.

Control Message Format

The SSTP control message, as discussed above, will be present after the SSTP_HEADER, provided the PacketType is SSTP_PACKET_TYPE_CONTROL. The control message will consist of a ControlMessageType and a number of attribute-length-value fields which form the complete control message. The control message types are defined as follows:

| Name | Value |
|---|---|
| SSTP_MSG_CALL_CONNECT_REQUEST | 0x0001 |
| SSTP_MSG_CALL_CONNECT_ACK | 0x0002 |
| SSTP_MSG_CALL_CONNECT_NAK | 0x0003 |
| SSTP_MSG_CALL_CONNECTED | 0x0004 |
| SSTP_MSG_CALL_ABORT | 0x0005 |
| SSTP_MSG_CALL_DISCONNECT | 0x0006 |
| SSTP_MSG_CALL_DISCONNECT_ACK | 0x0007 |
| SSTP_MSG_ECHO_REQUEST | 0x0008 |
| SSTP_MSG_ECHO_RESPONSE | 0x0009 |

```
typedef struct _SSTP_CONTROL_MESSAGE
{
    USHORT   MessageType;
    USHORT   NumAttributes;
    BYTE     Attributes[0];
} SSTP_CONTROL_MESSAGE, *PSSTP_CONTROL_MESSAGE;
```

```
0      8         16        24        32
+----+----+----+----+----+----+----+----+--
|Message Type      | Num Attribute    |...
+----+----+----+----+----+----+----+----+--
```

```
typedef struct _SSTP_CONTROL_ATTRIBUTE
{
    BYTE           Reserved; // Can be used for metadata for
                             attribute
    BYTE           AttributeId;
    SSTP_LENGTH    AttributeLength;
    BYTE           Value[0]; // Of size AttributeLength bytes to
                             follow
} SSTP_CONTROL_ATTRIBUTE,
  *PSSTP_CONTROL_ATTRIBUTE;
```

```
0        8       16       24       32
+----+----+----+----+----+----+----+----+---
| Reserved|AttribId |Rsvd| AttribLength |   Value
+----+----+----+----+----+----+----+----+------
```

| Name | Value |
|---|---|
| SSTP_ATTRIBUTE_ENCAPSULATED_PROTOCOL_ID | 0x01 |
| SSTP_ATTRIBUTE_STATUS_INFO | 0x02 |
| SSTP_ATTRIBUTE_CRYPTO_BINDING | 0x03 |
| SSTP_ATTRIBUTE_CRYPTO_BINDING_REQ | 0x04 |
| SSTP_ATTRIBUTE_SESSION_COOKIE | 0x05 |

The SSTP_ATTRIBUTE_SESSION_COOKIE is an optional attribute which, when sent in the SSTP_MSG_CALL_CONNECT_REQUEST, may act as a differentiator for the server to categorize this request to be a new session to an already existing SSTP connection as against a new SSTP connection itself. This optional attribute may be a nonce received with an earlier connection establishment from the server.

The SSTP_ATTRIBUTE_CRYPTO_BINDING_REQ attribute may be sent by the server to the client if it chooses to validate the authenticity of the client based on the authentication data from the higher layer (for example, PPP). This may comprise the nonce, which may be the session cookie for multi-session establishment, and the hash protocol to be used for computing the crypto-binding.

The SSTP_ATTRIBUTE_CRYPTO_BINDING is an attribute sent by the client to the server once the higher layer authentication is complete which may use the hash algorithm as specified by the server and use the higher layer authentication data to compute the crypto-binding value.

The SSTP_ATTRIBUTE_COMPLETION_STATUS attribute is used to indicate the completion status of a request. This can occur more than once in a control message. The value is of 8 bytes size with the following structure:

```
typedef struct _SSTP_ATTRIB_VALUE_COMPLETION_STATUS
{
    BYTE    Reserved[3];
    BYTE    AttribId;
    DWORD   Status;
    BYTE    AttribValue [0];
} SSTP_ATTRIB_VALUE_COMPLETION_STATUS,
*PSSTP_ATTRIB_VALUE_COMPLETION_STATUS;
```

In a negative acknowledgement (NAK) message, this attribute will provide more information on why a specific attribute is being rejected. For example, a server may response with AttribId SSTP_ATTRIBUTE_ENCAPSULATED_PROTOCOL_ID and Status being ERROR_NOT_SUPPORTED to indicate that transporting the specific protocol over SSTP is not supported by the server.

In the above event, the original attribute has some specific value to which the server is not adhering, this attribute will have some value specific to the attribute being rejected starting with AttribValue. For example, if the client is negotiating for SSTP_ATTRIBUTE_ENCAPSULATED_PROTOCOL_ID with values A, B and C, if the server is not accepting B and C, it may send 2 COMPLETION_STATUS attribute with the AttribValue holding a USHORT of the protocol ID not being accepted. If the attribute value that is being rejected exceeds 64 bytes, the value size will be truncated to 64 bytes in the NAK message.

The SSTP_ATTRIBUTE_ENCAPSULATED_PROTOCOL_ID attribute specifies the protocol id that will be transmitted over the SSTP encapsulation. In a given message, there can be multiples of this attribute for all the various protocol IDs to be supported.

```
typedef enum _SSTP_ENCAPSULATED_PROTOCOL_ID
{
    SSTP_PROTOCOL_ID_PPP =1
} SSTP_ENCAPSULATED_PROTOCOL_ID,
*PSSTP_ENCAPSULATED_PROTOCOL_ID;
```

When a client tries to establish a SSTP session with the server, the SSTP_MSG_CALL_CONNECT_REQUEST attribute will be the first message that gets sent out. This has the following attributes:

SSTP_ATTRIBUTE_PRIMARY_SESSION_COOKIE
SSTP_ATTRIBUTE_ENCAPSULATED_PROTOCOL_ID

A client can resend this message with different values for the various attributes (or a different set of attributes) based on the outcome of the earlier request. There may be a predefined number of renegotiation of parameters after which the connection will be aborted.

SSTP_MSG_CALL_CONNECT_ACK may be sent in response to a connect request and it will have the CRYPTO_BINDING_REQ. Otherwise, this message will not have any attributes: SSTP_ATTRIBUTE_CRYPTO_BINDING_REQ.

The SSTP_MSG_CALL_CONNECT_NAK attribute may be sent in response to a connect request and it will have the list of attributes that are not accepted by the server. In response to a NAK, the client MUST send out a new CONNECT_REQUEST with all the attributes and their values that it wants. It cannot provide only the adjusted values. Unless the server is ACKing, it will not store the attribute values passed by the client.

The SSTP_MSG_CALL_CONNECTED attribute may be sent by the client to complete the handshake with the server in response to SSTP_MSG_CALL_CONNECT_ACK. This may have the SSTP_ATTRIBUTE_CRYPTO_BINDING computed after the higher layer authentication is done.

When a client wants to add more sessions to an existing SSTP session, it may do so by passing the SSTP_ATTRIBUTE_PRIMARY_SESSION_COOKIE (which may be a nonce established in the earlier session establishment) in SSTP_MSG_CALL_CONNECT_REQUEST. This may enable the server to identify the appropriate authentication data that should be used to validate the crypto-binding. The server will provide the SSTP_ATTRIBUTE_CALL_CONNECT_ACK with the crypto-binding request with a different Nonce value which the client has to use to recomputed the crypto-binding.

SSTP_MSG_CALL_ECHO_REQUEST is a keep-alive message and it does not have any associated attributes.

SSTP_SG_CALL_ECHO_RESPONSE is a keep-alive message sent in response to the echo request and it doesn't have any attributes associated. If the response has not been received from the remote site for 2 iterations and there is no data traffic flowing, the connection will be aborted.

The SSTP_MSG_CALL_DISCONNECT attribute may be sent by either the client/server to initiate disconnect. All the data packets received from the server after a disconnect request has been sent will be dropped. This can optionally have a SSTP_ATTRIBUTE_COMPLETION_STATUS. After the disconnect request has been sent to the remote site, the local site should wait for a disconnect timeout or until the disconnect ACK is received. There will not be any retransmission done.

The SSTP_MSG_CALL_DISCONNECT_ACK attribute may be sent by either the client or server, after receiving the SSTP_MSG_CALL_DISCONNECT from the remote site. This may not have any attributes.

The SSTP_MSG_CALL_ABORT attribute may be sent whenever there is a failure in the basic SSTP negotiation. It could be a failure to converge on the connect request parameters or it could be due to a failure to match the Fast Reconnect cookie to a connection context. This may have the SSTP_ATTRIBUTE_COMPLETION_STATUS to indicate the reason for the failure.

Data Message Format

When the ControlMessage bit is OFF, the payload will represent the protocol data negotiated. As discussed above, in one embodiment, the payload of one protocol may be supported. However, in another embodiment, the SSTP channel protocol may be used to route packets of heterogeneous protocols.

Figure 4:
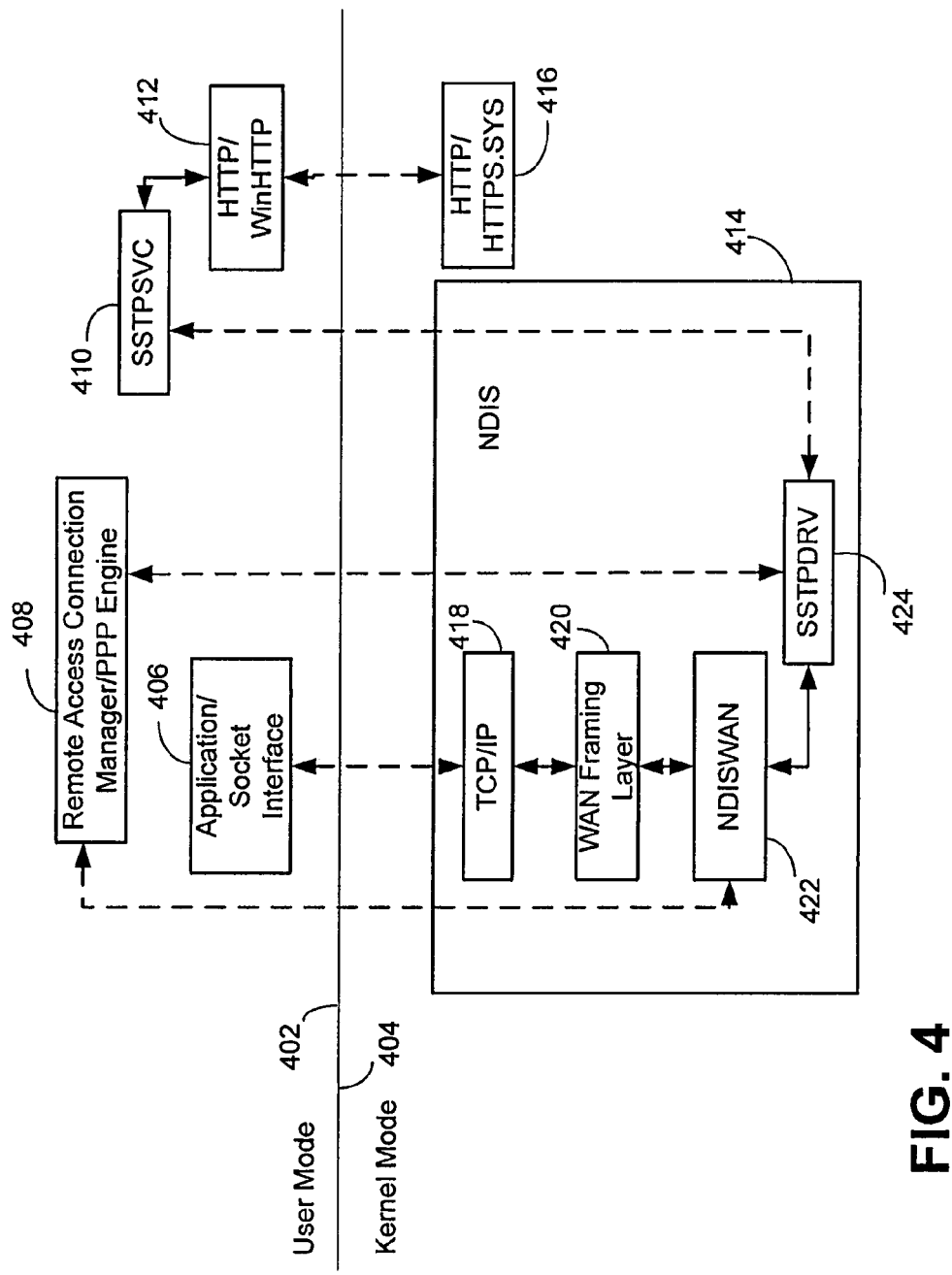
FIG. 4 is a schematic block diagram illustrating user and kernel mode components that support a SSTP tunnel in accordance with one embodiment of the present invention.

FIG. 4 is a simplified and representative block diagram of functional blocks (e.g., components or modules) supporting one embodiment of a SSTP connection showing the relationships of the functional blocks with respect to user and kernel modes of operation. This figure is used to illustrate in more detail the control and data traffic associated with the SSTP protocol.

User mode modules 402 support all user applications and are restricted from direct access to hardware. Kernel mode modules 404 maintain control over all hardware resources and are the only modules to have direct access to hardware, such as a network interface. In this illustrative figure, the user mode modules are an application/socket interface 406, a remote access connection manager and PPP engine 408 (RASMAN), a SSTP service 410 (SSTPSVC) and a HTTP/WinHTTP module 412.

Kernel mode modules include a network driver interface specification 414 (NDIS) that is the definition of application to hardware network protocols and HTTP/HTTPS system files 416. The NDIS 414 includes a TCP/IP module 418, a wide area network (WAN) framing module 420, a NDIS wide area network module 422, and a SSTP driver 424 (SSTPDRV). The dashed lines in FIG. 4 indicate trans-mode connections, while solid lines indicate connections within a mode.

In operation, after the HTTPS session is successfully established (e.g., a TCP connection and the SSL handshake are performed), the SSTPSVC 410 at a first computer, e.g., first computer 202 of FIG. 2, may setup a SSTP session context with the remote site, for example, second computer 204 of FIG. 2. That is, after the SSL handshake is done, the SSTPSVC 410 may trigger contextual setup activity within the HTTPS module. After this is done, the SSTPDRV 424 may then start a SSTP finite state machine over the HTTPS session. During this phase, only SSTPDRV/SSTPSVC 410 and 424 and HTTPS 416 modules are interacting. Once this setup is complete, a binding will be created between the NDISWAN 422 and the SSTP session. The remote access connection manager (RASMAN) 408 may be notified of the SSTP session by the NDISWAN and may initiate the PPP negotiation over the SSTP connection. The PPP finite state machine may be implemented in the RASMAN 408 (within a loaded PPP module). The PPP control packet will be passed directly from RASMAN 408 to the NDISWAN 422. The NDISWAN 422 will pass it to SSTPDRV 424. The SSTP driver will hand over the packet to SSTPSVC 410 and the SSTPSVC 410 will pass it on to HTTPS module 412. Typically, the HTTPS module 412 passes the data to the TCP/IP module 418 for routing over the network. There will be an outstanding SSTP_POST request with just the initial header sent to the remote server. The server will immediately reply back with a PUT response. The PUT request continuation (as entity body) will form the client-to-server data traffic and the response entity body will be the server-to-client data traffic. After the headers are exchanged, the SSTP protocol is available for use. After the PPP negotiation is complete, the channel may be ready for tunneling application traffic.

When the channeling tunnel is ready, data traffic may be carried over the link. The kernel mode TCP/IP module 418 may accept traffic in a form of a data packet from the application and socket interface 406 in the user mode. The TCP/IP module 418 identifies that the packet is to be routed through the SSTP tunnel and hands it over to the WAN framing module 420. The WAN framing module 420 may map the connection (SSTP) to a correct interface and pass it to the NDISWAN module 422. This is roughly the equivalent to PPP module 308 of FIG. 3. The NDISWAN module 422 is responsible for PPP framing and compression. Any encryption that might be done at a PPP module at this layer is turned off because it will be SSL encrypted. From this point on, the sequence of operations will be the same as the control traffic above, that is, to the RASMAN 408, SSTPDRV 414, SSTPSVC 410 and HTTPS module 416. Once the SSTP/PPP encapsulated data bytes reach the HTTPS module, the HTTPS module will send them over the TCP connection (default port 443) after doing SSL encryption. So the packet again comes to TCP/IP module 418 from the user-mode HTTPS module but the routing will determine that this traffic may go over the Ethernet interface (not shown) instead of to the WAN framing module 420 as with the original application data.

The description above describes how a secure tunnel (e.g., a SSTP tunnel) with a single link (e.g., a single SSTP session) may be established. Using the SSTP protocol, data traffic (e.g., PPP traffic), which is datagram oriented may be encapsulated over stream oriented SSL session. Therefore, the PPP traffic may traverse NATs and firewalls. SSL may enable data encryption and PPP may enable client authentication.

As described above, Applicants have appreciated that network capabilities may sometimes be underutilized when a secure tunnel is used to transmit data between a client and a server, such that benefits can be achieved by employing multiple sessions for a secure tunnel. In some embodiments, the performance of the network can be evaluated (e.g., by evaluating one or more network characteristics) to evaluate the desirability of forming multiple links for a single secure tunnel.

In some embodiments of the invention, the network characteristics that may be monitored and/or evaluates to determine whether additional sessions or links may be desired may comprise network latency and/or packet loss rate. However, it should be appreciated that the invention is not limited in this respect, as any other suitable network characteristics may be used to make a decision regarding the desirability of establishing multiple sessions for a secure tunnel.

The bandwidth under-utilization may depend on the Network latency and packet loss rate. The available bandwidth is typically negotiated between a client computer and an ISP, and can be measured in any suitable way. Some client computers (e.g., SSTP client 102 or 202) include components that provide functionality of measuring network latency between the client and a server. For example, SSTP module 314 shown in FIG. 3 and/or the TCP/IP protocol stack of the client computer may be used to measure latency using known techniques. However, the embodiment wherein latency is evaluated to determine the desirability of establishing multiple links is not limited to using these techniques for measuring latency, as any suitable technique may be employed.

Figure 5:
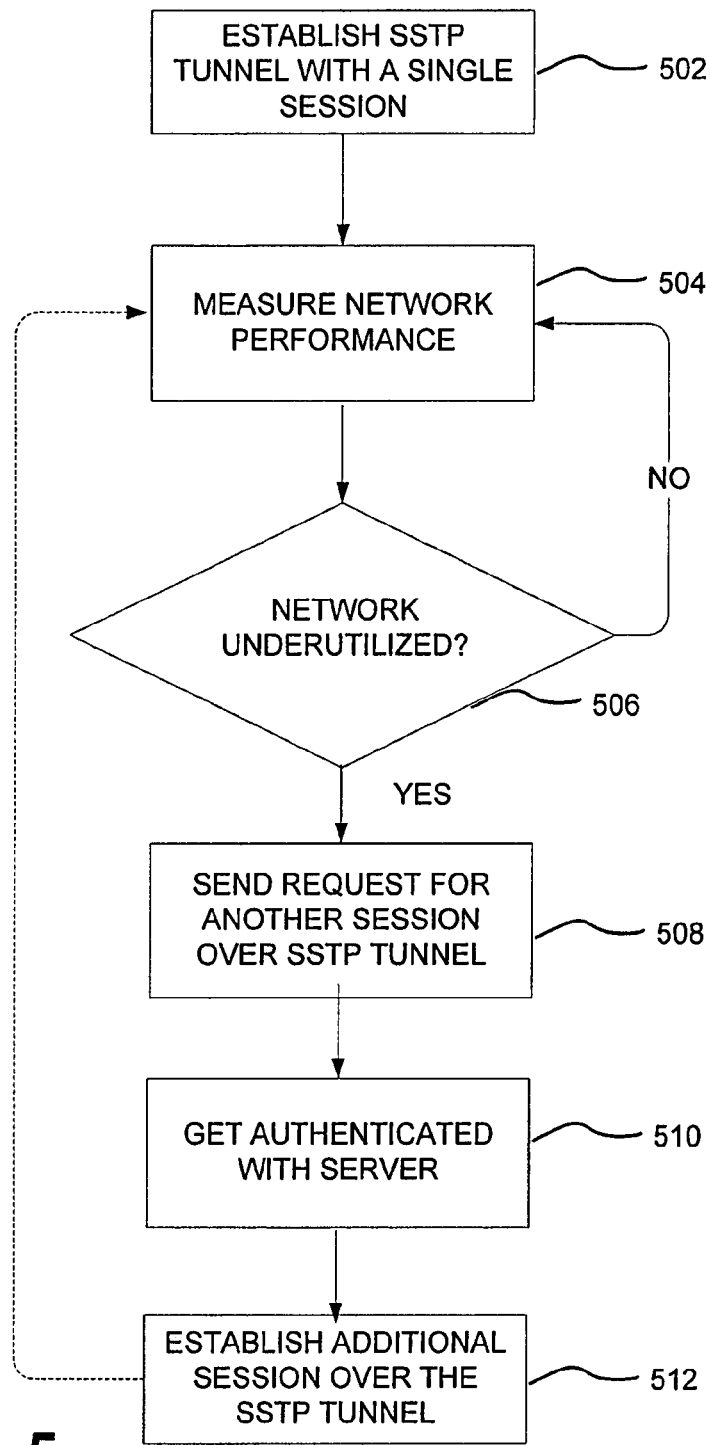
FIG. 5 is a flow chart illustrating a method of establishing multiple sessions over a SSTP tunnel in accordance with one embodiment of the present invention.

FIG. 5 is a flow chart that schematically illustrates a method of establishing multiple sessions for a SSTP tunnel in accordance with one embodiment of the invention. The process may start at block 502 where a SSTP tunnel is established between any two computers (e.g., a client and a server) that are enabled to be connected via a secure tunnel. It should be appreciated that in the example illustrated, the secure tunnel is a VPN tunnel based on the SSTP protocol, but the invention is not limited in this respect, and can be used to establish multiple links for other types of secure tunnels based on SSTP. In the description below, the connection is described as by a tunnel between a client and server, with the client initiating the establishment of multiple links, but the invention is not limited in this respect, as the method can be employed between any two computers.

The SSTP tunnel may be established in any suitable way. For example, as described above, the client may connect to the server via a TCP connection followed by a SSL handshake which establishes a HTTPS session. A state machine that manages the SSTP protocol may then by activated by a SSTP driver (e.g., SSTPDRV 424) to establish a SSTP connection. This may be followed by negotiating a PPP session over the SSTP connection which renders the SSTP tunnel ready for tunneling application traffic via the PPP protocol. It should be appreciated that any suitable application traffic using any suitable protocol may be communicated over the SSTP connection.

To determine whether it is desirable to add additional links for the established SSTP tunnel, performance parameters of the TCP connection may be measured, as shown in block 504. Available bandwidth may be higher than bandwidth that a TCP connection may utilize, which may affect performance of the SSTP tunnel established over the TCP connection. As mentioned above, any suitable parameters may be measured. For example, such performance measure parameters as, for example, network connection latency (e.g., the time required for a byte to travel from one end of the connection to another) and data loss rate, may be determined by a SSTP layer (e.g., SSTP module 314) or within the TCP/IP stack (e.g., by TCP/IP module 418). In some embodiments, the additional links may also be established based on configuration settings present in the system.

In one embodiment of the invention, network latency of data traffic between the client and the server higher than 100 milliseconds and/or data loss greater than 10% may indicate that the TCP connection is saturated at a throughput of about 2 Mbps, despite the fact that available bandwidth may be higher. Thus, such conditions may indicate that the performance of the connection may benefit from forming additional links. It should be appreciated that the invention is not limited in this respect, as other thresholds for latency and/or data loss may be used, and other network performance measure parameters may be evaluated, to determine that performance of the SSTP tunnel could be improved via one or more additional links.

Based on the measurements of the network performance, in decision block 506, it may be determined whether the capabilities of the network connection are underutilized. If so, the process proceeds to block 508, where the client may send a request to the server to establish another session over the existing SSTP tunnel. Otherwise, if the measured network characteristics do not indicate that the network is underutilized, the process may return to block 504 where network performance may continue to be monitored.

In accordance with one embodiment, it is desirable to employ some techniques for associating multiple links established for a single tunnel, so that the multiple links can be used in parallel for the tunnel, as opposed to being treated as forming separate tunnels. This can be done in any suitable way, as the invention is not limited in this respect.

In one embodiment, upon sending the request to the server to establish an additional session over the SSTP tunnel in block 508, the client authenticates with the server to associate the additional session with the SSTP tunnel, as shown in block 510. This can be done in any suitable way. In one embodiment, a crypto-binding mechanism may be provided by the SSTP protocol whereby a higher-layer protocol (e.g., PPP) may provide the client authentication, which is described in detail below. The process may then proceed to block 512 where the additional session over the SSTP tunnel may be established. The client may optionally return to block 504 to continue monitoring network performance to determine whether more sessions should be established over the SSTP tunnel.

In one embodiment, the use of multiple SSTP sessions in a SSTP tunnel may be transparent to applications communicating via the tunnel. Data may be distributed among the multiple sessions using any suitable technique, including a round-robin mechanism or any other. Furthermore, data may be sent based on characteristics of the applications and protocols utilizing the tunnel. In some embodiments of the invention, data is distinguished along the multiple sessions.

As described above, in one embodiment, additional sessions established for a secure tunnel are associated with the tunnel. In one embodiment, an authentication mechanism based on the Fast Reconnect of the SSTP protocol may be used to perform the authentication of multiple sessions within a secure tunnel such as a SSTP tunnel, although other techniques are possible. The Fast Reconnect may demonstrate that a new SSTP session belongs to the same client that negotiated a higher protocol layer (e.g., a PPP layer). As described above, during the SSL handshake, or negotiation, performed as part of a HTTPS session establishment, the SSTP client may authenticate the SSTP server. The SSTP server may optionally authenticate the SSTP client. When the client is not authenticated with the SSTP server, there is a risk of an attacker implementing a man-in-the-middle attack whereby the attacker may establish a HTTPS connection to the SSTP server and forward data packets (e.g., PPP packets) that are received from the SSTP client for communications other than SSTP communications (e.g., wireless communications). To prevent man-in-the-middle attacks, the authentication of the SSTP client with the SSTP server and the authentication of the SSTP server with the SSTP client may be cryptographically bound. The SSTP protocol may implement such cryptographic binding by requiring the client send, as a SSTP message, a value derived from authentication parameters negotiated during an authentication provided by a higher-layer protocol (e.g., PPP authentication) over the HTTPS connection. However, the invention is not limited in this respect, as other authentication credentials may be used as part of the SSTP message. For example, in one embodiment, a cryptographic nonce may be substituted.

The SSTP client may be authenticated by the SSTP server during the higher-layer protocol authentication. Using the SSTP message, the SSTP client can prove that it was authenticated with the SSTP server, and the higher-layer protocol authentication was for SSTP communications. Because the client has already been authenticated to the SSTP server during SSL negotiation as part of HTTPS connection establishment, the client can also confirm from the SSTP server either that there is no man-in-the-middle attack or that the entity between the client and server is an entity that the SSTP server may trust. This process, which is referred to herein as crypto-binding, may be used to protect the SSTP connection against man-in-the-middle attacks.

Figure 6A:
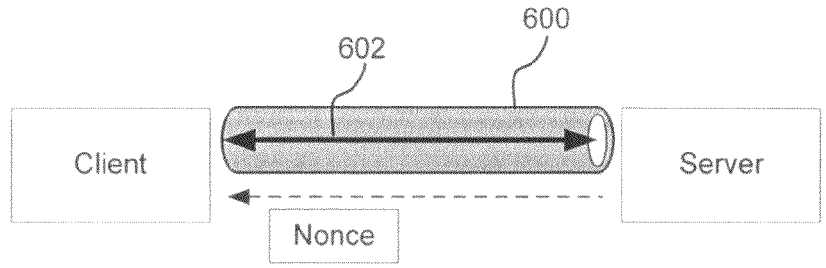
FIGS. 6A-6D are schematic diagrams illustrating of a process of authentication of a client and a server to establish multiple sessions over a SSTP tunnel in accordance with one embodiment of the present invention.
Figure 6B:
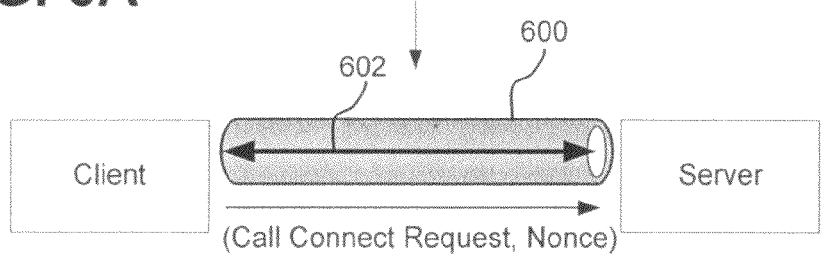
Figure 6C:
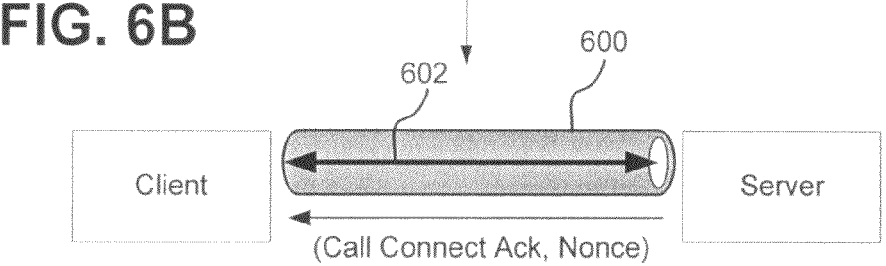
Figure 6D:
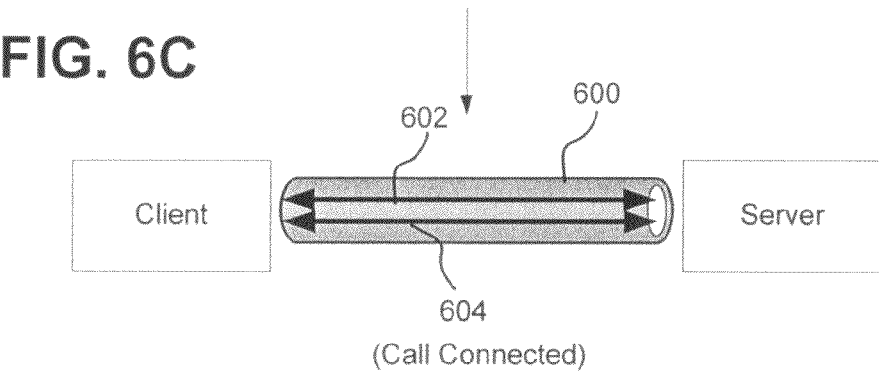

The crypto-binding mechanism may be used to establish additional sessions over the SSTP tunnel, which is schematically shown in FIGS. 6A-6D. As illustrated in FIG. 6A, a server (e.g., a SSTP server) sends a connection identification by way of example only as a nonce to a client (e.g., a SSTP client) during establishment of a secure tunnel 600 (e.g., a SSTP tunnel) with a single session 602 (e.g., a SSTP session). To establish an additional session over the secure tunnel, the client may send to the server a Call Connect Request that may comprise the nonce that was previously provided by the server to the client during establishment of the secure tunnel, as shown in FIG. 6B. The server may then authenticate the additional session using the nonce and send a Call Connect Acknowledgment to the client, along with a nonce for authentication of subsequent sessions, as shown in FIG. 6C. In essence, the server may validate that the client that is requesting additional session is the same client that has previously established the secure tunnel with the server. Finally, the client may send the server a Call Connected message along with the crypto-binding to establish the identity of the client as claimed with the nonce that it sent initially and an additional session 604 is established over the secure tunnel 604, as shown in FIG. 6D. Any higher-layer data traffic may now be transmitted over the session 604 or the session 602. It should be appreciated that the particular messages described above as being sent between the client and server are shown by way of example only and any other suitable messages and attributes may be used.

The methods and systems described herein can be implemented on any suitable computer system, including a single computer devices or a collection of distributed devices coupled in any suitable way.

Figure 7:
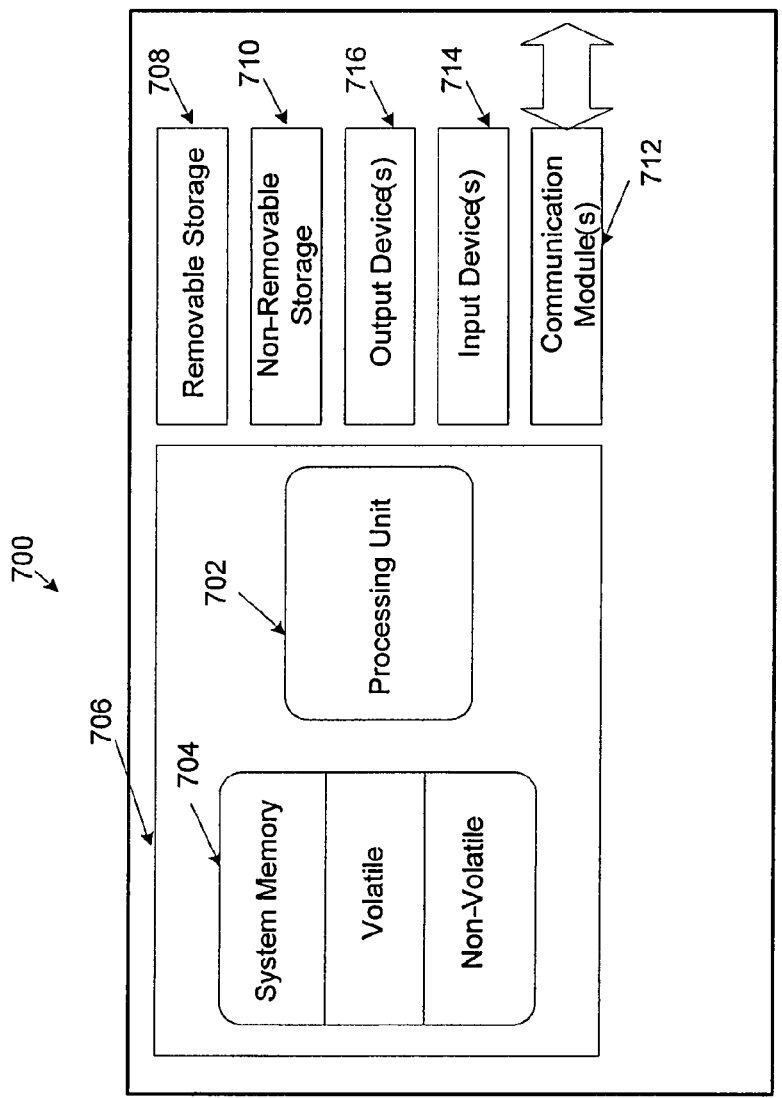
FIG. 7 is a schematic diagram illustrating a computing device on which embodiments of the invention can be implemented.

FIG. 7 illustrates an exemplary computer system for implementing some embodiments. FIG. 7 illustrates computing device 700, which includes at least one processor 702 and memory 704. Depending on the configuration and type of computing device, memory 704 may be volatile (such as RAM), non-volatile (such as ROM, flash memory, etc.) or some combination of the two.

Device 700 may include at least some form of computer readable media. By way of example, and not limitation, computer readable media may comprise computer storage media. For example, device 700 may also include storage (removable and/or non-removable) including, but not limited to, magnetic or optical disks or tape. Such additional storage is illustrated in FIG. 7 by removable storage 708 and non-removable storage 710. Computer storage media may include volatile and nonvolatile media, removable, and non-removable media of any type for storing information such as computer readable instructions, data structures, program modules or other data. Memory 704, removable storage 608 and non-removable storage 710 all are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 700. Any such computer storage media may be part of device 700. Device 700 may also contain network communications module(s) 712 that allow the device to communicate with other devices via one or more communication media. By way of example, and not limitation, communication media may include wired media such as a wired network or direct-wired connection, and wireless media such as acoustic, RF, infrared and other wireless media. Network communication module(s) 712 may be a component that is capable of providing an interface between device 700 and the one or more communication media, and may be one or more of a wired network card, a wireless network card, a modem, an infrared transceiver, an acoustic transceiver and/or any other suitable type of network communication module.

In one embodiment, the methods and systems described herein may be implemented via software code that is stored on one or more computer readable media and includes instructions that when executed (e.g., on processor 702) implement parts or all of the techniques described herein.

Device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be appreciated that the techniques described herein are not limited to executing on any particular system or group of systems. For example, embodiments may run on one device or on a combination of devices. Also, it should be appreciated that the techniques described herein are not limited to any particular architecture, network, or communication protocol.

The techniques described herein are not limited in their application to the details of construction and the arrangement of components set forth in the following description or illustrated in the drawings. The techniques described herein are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of communicating data over a network, the method comprising:
   establishing a first Secure Socket Tunneling Protocol (SSTP) session through the network between a computer and another computer in a secure SSTP tunnel through the network between the computer and the other computer, the secure SSTP tunnel conveying data for a secure point-to-point session over the first SSTP session in the secure SSTP tunnel;
   determining an underutilization of at least one capability of the network based on at least one performance characteristic, wherein the at least one performance characteristic includes at least one of a network latency characteristic or a data loss characteristic;
   establishing a second SSTP session in the secure SSTP tunnel in response to the determination of the underutilization of the at least one capability of the network;
   associating the second SSTP session to the first SSTP session; and transmitting data for the secure point-to-point session over the associated first and second SSTP sessions.

2. The method of claim 1, wherein establishing the first SSTP session includes:
negotiating authentication parameters for the first SSTP session.

3. The method of claim 1, wherein:
the computer comprises a client and the other computer comprises a server;
the method further comprises sending, by the client, a request to establish a new SSTP session in the secure SSTP tunnel;
the request comprises an indicator that the new SSTP session is a new session of the secure point-to-point session; and
the secure point-to-point session is carried over a single logical channel.

4. The method of claim 1, wherein the secure SSTP tunnel is implemented over a hypertext transport protocol secure (HTTPS) connection.

5. The method of claim 1, wherein the secure SSTP tunnel is implemented as a virtual private network tunnel based on the SSTP.

6. The method of claim 1, wherein the first and second SSTP sessions are associated with the secure SSTP tunnel via a same authentication.

7. The method of claim 6, wherein the first computer comprises a client and the other computer comprises a server, and wherein the same authentication for the first and second SSTP sessions comprises the client authenticating the server using a secure socket layer channel and the server authenticating the client using a point-to-point protocol.

8. The method of claim 1, further comprising:
determining the at least one performance characteristic; and
establishing at least a third SSTP session in the secure SSTP tunnel in response to a determination that the at least one performance characteristic is below a threshold.

9. The method of claim 8, wherein the at least one performance characteristic further includes a throughput of the secure SSTP tunnel.

10. The method of claim 8, wherein:
the at least one performance characteristic includes the network latency characteristic; and
determining the underutilization of the at least one capability of the network includes:
determining whether latency in the secure SSTP tunnel is above a threshold.

11. The method of claim 8, wherein:
the computer comprises a client and the other computer comprises a server;
the at least one performance characteristic includes the data loss characteristic; and
the method further comprising determining whether data loss in the network between the client and the server is above a threshold.

12. The method of claim 3, wherein the method further comprises:
establishing the new SSTP session including:
sending from the client a call connect request including a session cookie the call connect request for validation by the server via use of the session cookie;
receiving by the client from the server a call connect acknowledgment with a challenge for a crypto-binding; and
sending from the client a call connected message with the crypto-binding to indicate that the client is capable of establishing the new SSTP session.

13. At least one computer-readable storage device having stored thereon computer-executable instructions for communicating data over a network, the communicating comprising:
establishing a first Secure Socket Tunneling Protocol (SSTP) session through the network between a computer and a another computer in a secure SSTP tunnel through the network between the computer and the other computer, the secure SSTP tunnel conveying data for a secure point-to-point session over the first SSTP session in the secure SSTP tunnel;
determining an underutilization of at least one capability of the network based on at least one performance characteristic, wherein the at least one performance characteristic includes at least one of a network latency characteristic or a data loss characteristic;
establishing a second SSTP session in the secure SSTP tunnel in response to the determination of the underutilization of the at least one capability of the network;
associating the second SSTP session to the first SSTP session; and
transmitting data for the secure point-to-point session over the associated first and second SSTP sessions.

14. The at least one computer-readable storage device of claim 13, wherein the communicating further comprises:
determining the at least one performance characteristic of the secure SSTP tunnel.

15. The at least one computer-readable storage device of claim 14, wherein the at least one performance characteristic is indicative of throughput of the first secure SSTP tunnel being lower than available bandwidth of the network.

16. The at least one computer-readable storage device of claim 14, wherein:
the at least one performance characteristic includes the network latency characteristic; and
the network latency characteristic is indicative of latency in the secure SSTP tunnel being above a threshold.

17. A computer comprising:
at least one hardware processor programmed to:
establish a first Secure Socket Tunneling Protocol (SSTP) session through a network between the computer and another computer in a secure SSTP tunnel through the network between the computer and the another computer, the secure SSTP tunnel conveying data for a secure point-to-point session over the first SSTP session in the secure SSTP tunnel;
determine an underutilization of at least one capability of the network based on at least one performance characteristic, wherein the at least one performance characteristic includes network latency and/or data loss;
establish a second SSTP session in the secure SSTP tunnel in response to the determination of the underutilization of the at least one capability of the network;
associate the second SSTP session to the first SSTP session; and
transmit data for the secure point-to-point session over the associated first and second SSTP sessions.

18. The computer of claim 17, wherein the first and second SSTP sessions employ a same authentication.

19. The computer of claim 17, wherein the at least one hardware processor is further programmed to:
   automatically establish additional SSTP sessions in the secure SSTP tunnel in response to the at least one performance characteristic of the secure SSTP tunnel being below a threshold.

20. The computer of claim 17, wherein the first SSTP session and the second SSTP session are associated with each other as a single logical channel.

\* \* \* \* \*